US010221026B2

(12) United States Patent
Eimann et al.

(10) Patent No.: US 10,221,026 B2
(45) Date of Patent: Mar. 5, 2019

(54) DEVICE FOR TRANSPORT OF BRISTLES FOR BRUSH PRODUCTION COMPRISING A BAFFLE PLATE WITH CONICALLY SHAPED VENTS

(71) Applicant: The Procter & Gamble Company, Cincinnati, OH (US)

(72) Inventors: Klaus Eimann, Zellingen (DE); Christian Gehret, Rieneck (DE); Sven Penirschke, Karbach (DE)

(73) Assignee: THE PROCTER & GAMBLE COMPANY, Cincinnati, OH (US)

( * ) Notice: Subject to any disclaimer, the term of this patent is extended or adjusted under 35 U.S.C. 154(b) by 509 days.

(21) Appl. No.: 14/663,902

(22) Filed: Mar. 20, 2015

(65) Prior Publication Data
US 2015/0266685 A1   Sep. 24, 2015

(30) Foreign Application Priority Data

Mar. 20, 2014   (EP) ..................... 14160871

(51) Int. Cl.
| | |
|---|---|
| *B65H 5/22* | (2006.01) |
| *A46D 3/08* | (2006.01) |
| *B23K 26/388* | (2014.01) |
| *B65G 51/02* | (2006.01) |

(52) U.S. Cl.
CPC ............ *B65H 5/222* (2013.01); *A46D 3/082* (2013.01); *B23K 26/388* (2013.01); *B65G 51/02* (2013.01)

(58) Field of Classification Search
CPC ........ B65H 5/22; A46D 3/082; B23K 26/388; B65G 51/02
See application file for complete search history.

(56) References Cited

U.S. PATENT DOCUMENTS 5,006,900 A * 4/1991 Baughman ......... G03G 15/1685
                                                     399/298

FOREIGN PATENT DOCUMENTS

| | | |
|---|---|---|
| DE | 10303872 | 8/2004 |
| DE | 102010055686 A1 * | 6/2012 ............ A46D 3/005 |
| WO | WO 2011/128020 | 10/2011 |

* cited by examiner

*Primary Examiner* — Shay Karls
(74) *Attorney, Agent, or Firm* — Vladimir Vitenberg

(57) ABSTRACT

A transportation device for transferring bristles from one location to another location comprises a tube system and a baffle plate comprising conically shaped vents. The baffle plate is arranged at one end of the tube system in order to stop the movement of the bristles transported inside the tube system using airflow. Such a transportation system may be part of a device for automated production of brushes, in particular toothbrushes. A plurality of bristles can be transferred by such transportation system in order to be arranged in a pre-defined bristle pattern corresponding to a bristle field of a brush, in particular a tooth brush.

14 Claims, 2 Drawing Sheets

DEVICE FOR TRANSPORT OF BRISTLES FOR BRUSH PRODUCTION COMPRISING A BAFFLE PLATE WITH CONICALLY SHAPED VENTS

FIELD OF THE INVENTION

There is provided an improved transportation device for providing bristles for automated production of brushes, in particular toothbrushes. The transportation device uses airflow in flexible tubes in order to transfer individual bristles, bristles tufts or a plurality of bristles to a brush forming device. The improved transportation device comprises in particular an improved baffle plate comprising conically shaped vents. In addition, there is provided a method for providing such a baffle plate using laser drilling.

BACKGROUND OF THE INVENTION

Toothbrushes, in particular manual toothbrushes, are constructed as disposable articles. Latest after three month of use a manual toothbrush shall be replaced at least due to hygienic reasons. That means that consumer generally expect a low pricing for manual toothbrushes. On the other hand, manual toothbrushes have to meet a lot of technical requirements, such as complex bristle fields in order to clean properly interdentally, the gum line as well as the back molar teeth. Further, a manual toothbrush has to be smooth to the gum and comfortable to handle. Thus, there is a continuous need for the manufacturer of manual toothbrushes to optimize production processes in order to work very cost effective. One problem of the manufacturing of manual toothbrushes is the production time. Speed reducing steps are the cooling times needed if injection molding is used and the complexity of the bristle fields. The latter requires a lot of successive steps, if anchor technology is used- to fasten the bristle filaments to the brush head. In contrast, anchor-free bristling technologies further improve the complexity of the molding procedure which as a consequence increases the molding time. That means a continuous need exists to optimize automated production of toothbrushes in order to produce toothbrushes with high and standardized quality at low costs.

Nowadays, productivity as well as machine performance and machine output, in particular outside the molding steps, may be suitable approaches to reduce costs. To improve flexibility and machine performance bristle providing tools were developed using airflow systems to transport bristles or bristle tufts (WO 2011/128020). Thereby, bristle tufts are picked from storage and transported via vacuum sucking through flexible plastic tubes. However, the transport via airflow in flexible tubes is operationally not reliable enough for high output numbers. Additionally these systems also show problems with dust accumulation and distribution. Thus, it is the object of the present disclosure to provide an improved transportation device using bristle transport via airflow which shows a high operational reliability.

SUMMARY OF THE INVENTION

In accordance with one aspect, there is provided a baffle plate suitable to stop a movement of an object, comprising a front side, a back side and two or more conically shaped vents, wherein the diameter of the conically shaped vents increases from the front side to the back side.

In accordance with another aspect, there is provided a transportation device for transferring bristles and/or bristle tufts for the automated production of brushes, in particular toothbrushes, comprising
 at least one tube comprising a first end and a second end in which the bristles and/or bristles tufts are transported;
 a nozzle arranged at the first end of the at least one tube suitable to guide the bristles and/or bristle tufts into the tube;
 a device for producing an airflow inside the at least one tube; and
 a baffle plate suitable to stop a movement of an object, comprising a front side, a back side and two or more conically shaped vents, wherein the diameter of the conically shaped vents increases from the front side to the back side,
wherein the baffle plate is arranged a the second end of the at least one tube and the device is arranged in such that the bristles and/or bristle tufts are transferred from the first end of the tube to the second end of the tube.

In accordance with another aspect, there is provided a method for producing a baffle plate suitable to stop a movement of an object, comprising a front side, a back side and two or more conically shaped vents, wherein the diameter of the conically shaped vents increases from the front side to the back side comprising
 providing a metal plate; and
 forming the two or more conically shaped vents using a solid state laser.

BRIEF DESCRIPTION OF DRAWINGS

These and other features will become apparent not only from the claims but also from the following description and the drawings, with the aid of which example embodiments are explained below.

DETAILED DESCRIPTION OF THE INVENTION

Figure 1A:
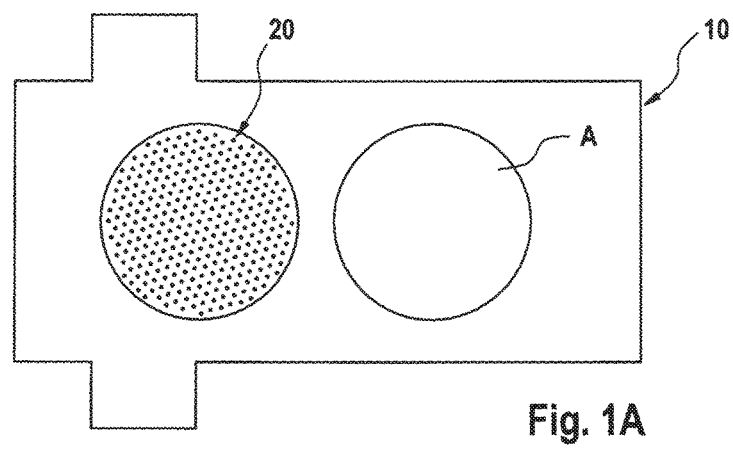
FIG. 1A shows a schematic sketch of a top view of a baffle plate 10 having conically shaped vents 20.

The following is a description of numerous versions of a transportation device usable in an automated process for brush production, in particular for toothbrush production. The description further discloses a baffle plate having conically shaped vents which can be used in the disclosed transportation device to stop the movement of an object, such as a bristle. The description is to be construed as exemplary only and does not describe every possible embodiment since describing every possible embodiment would be impractical, if not impossible, and it will be understood that any feature, characteristic, structure, component, step or methodology described herein can be deleted, combined with or substituted for, in whole or in part, any other feature, characteristic, structure, component, product step or methodology described herein. In addition, single features or (sub)combinations of features may have inventive character irrespective of the feature combination provided by the claims, the respective part of the specification or the drawings.

Further, detailed description of individual features as well as definitions and further specifications are disclosed with respect to both the baffle plate itself as well as the transportation device using the baffle plate, irrespectively of the respective part of the specification belongs primary to the baffle plate or the transportation device.

According to one aspect there is disclosed a baffle plate which is suitable to stop the movement of an object, such as individual bristles and/or arrangements of several bristles. Bristles may be for example monofilaments made from plastic material. Suitable plastic material used for bristles may be polyamide (PA), in particular nylon, polybutylterephthalate (PBT), polyethylterephthalate (PET) or mixtures thereof. In addition, the bristle material may comprise additives such as abrasives, color pigments, flavors etc. For example an abrasive such as kaolin clay may be added and/or the filaments may be colored at the outer surface in order to realize indicator material. The coloring on the outside of the material is slowly worn away as the filament is used over time to indicate the extent to which the filament is worn. Suitable additives are for example UV-brighteners, signaling substances, such as the indicator color pigments and/or abrasives.

The diameter of the bristle filament may be in the range from about 0.01 mm to about 0.3 mm, in particular in the range from about 0.05 mm to about 0.2 mm, more particular in the range of about 0.1 mm to about 0.16 mm or any other numerical range which is narrower and which falls within such broader numerical range, as if such narrower numerical ranges were all expressly written herein.

Length of the bristle depends on the intended use. Generally, a bristle filament can be of any suitable length for transporting; that means bristles are not manufactured as bristles of a pre-defined length, but as a continuous filament strand which is provided in roles or in large pieces of such strand. For example, bristle filament strands are available as hanks. A bristle "hank" as used herein is an arrangement of a plurality, namely about 120000, bristle filaments which are all arranged with parallel length axis. The length of the hank may be determined by handling requirements as longer hanks are handled more difficultly and from shorter hanks less bristles can be achieved. The diameter of a hank is defined by the diameter and number of the bristles forming one hank. For example, a suitable hank may have a length of about 1200 mm and a diameter of about 55 mm. The outer surface of the hank may be covered with an envelope, such as a plastic sheet.

From the hank slices of a predefined length can be cut. One of these slices is called herein a "puk" and comprises a plurality of bristles in a predefined length. Said predefined length is at least the length of the longest bristles arranged in the final brush plus the length of the bristle incorporated into the brush head. In addition or alternatively, the puk may also comprise the doubled length of the bristles for anchor based tufting or the length may be slightly larger than the length needed for the longest bristle for amendments of the bristle ends, such as cutting, end-rounding, splicing, tapering etc. A suitable thickness of a puk, corresponding to the length of the individual bristles provided therein may be in the range from about 5 mm to about 20 mm, in particular in the range from about 7 mm to about 17 mm, more particular in the range of about 8 mm to about 15 mm or any other numerical range which is narrower and which falls within such broader numerical range, as if such narrower numerical ranges were all expressly written herein. These length ranges given apply to bristles intended to be used in anchor free brushes. In addition, the length of a bristle influences the bending forces needed to bend the bristle. Thus, the length of a bristle can be used to realize different stiffness of bristles in a brush pattern.

A predefined number of bristles may be combined to one bristle tuft. Suitable numbers of bristles to form one bristle tuft may be for example in the range of about 10 to about 80, or in the range of about 15 to about 60, or in the range of about 20 to about 50, or in the range of about 25 to about 40, or any other numerical range which is narrower and which falls within such broader numerical range, as if such narrower numerical ranges were all expressly written herein.

The body of the baffle plate which is able to stop the movement of an object such as bristles may be made from a metal, a metal alloy or a ceramic material. Suitable metals are hard metals, such as stainless steel or soft metals, such as brass. Suitable ceramic materials are for example aluminum oxide, zirconium oxide, silicon carbide or silicon nitride.

In one or more predefined areas the baffle plate comprises a plurality of conically shaped vents. Alternatively, the conically shaped vents may be arranged all over the baffle plate. It is advantageous to distribute the vents not over the complete baffle plate, but in one or more predefined areas so that areas for mounting the baffle plate into a device, e.g. a transportation device, are remain which do not comprise any vents. The mounting areas without any vents may show different geometric properties, such as different thickness or comprising additional mounting elements compared to the areas comprising the vents. For example, the baffle plate may comprise a circumferential border at its backside in the areas which do not comprise the conically shaped vents. The outer outline of the border may correspond to the outline of the whole baffle plate, wherein the inner outline of the border may have any geometric shape. With the inner shape of the border the outline of the area of the vents is defined. More than one area comprising vents is possible. Having a border the baffle plate comprises a first thickness in the area of the vents and a second thickness in the remaining area of the baffle plate, wherein the second thickness corresponds to the thickness in the area of the vents plus the thickness of the border. Thus, the second thickness is larger than the first thickness. Suitable values for the first thickness are in the range of about 0.2 mm to about 5 mm, or in the range of about 0.3 mm to about 4 mm, or in the range of about 0.5 mm to about 3 mm, or any other numerical range which is narrower and which falls within such broader numerical range, as if such narrower numerical ranges were all expressly written herein. Suitable values for the second thickness are in the range of about 0.5 mm to about several mm, such as 15 mm, or in the range of about 1.0 cm to about 10 mm, or in the range of about 1 mm to about 5 mm, or any other numerical range which is narrower and which falls within such broader numerical range, as if such narrower numerical ranges were all expressly written herein. The outline of the baffle plate is not limited, but should meet the geometric requirement of the environment where the baffle plate is used. For example the outline of the baffle plate may be rectangular.

The area of the baffle plate wherein the conically shaped vents are arranged may be of any geometrical shape. For example, the area comprising the vents may be essentially circular, oval, elliptical, rectangular or any combination thereof.

The length of the conically shaped vents is equal to the thickness of the baffle plate in the area where the vents are arranged. That means due to the vents the baffle plate is pervious to air and can be used in airflow driven transportation devices. In addition, a sucking device may be arranged at the backside of the baffle plate which produces airflow in the direction of the baffle plate so that the object, e.g. a bristle is sucked in the direction of the baffle plate. If a device for producing airflow is arranged at the backside of the baffle plate the outline of the baffle plate, the border at the outline as well as the area comprising the conically shaped vents are adapted to be compatible to the geometric requirements of the sucking device. The conically shaped vents may be distributed regularly or irregularly over the area. In particular, if a sucking device is arranged at the backside of the baffle plate a regular arrangement of the vents is advantageous in order to produce a constant airflow over the whole area having the conically shaped vents.

The conically shaped vents each comprise a first opening area at the front side of the baffle plate and a second opening area at the backside of the baffle plate. The size of the opening area of the vents is different between the front side and the back side of the baffle plate so that a conically increasing channel is formed. The diameter of the opening area at the back side of the baffle plate is larger than the diameter of the opening area at the front side of the baffle plate. That means the diameter at the backside of the baffle plate determines the maximal number of conically shaped vents of the baffle plate. For example the diameter of the opening area at the back side may be in the range from about 1.2 to 4 times, in particular in the range from 1.5 to 3 times, more particular in the range from 1.8 to 2.5 times of the diameter of opening area of the vent at the front side of the baffle plate or any other numerical range which is narrower and which falls within such broader numerical range, as if such narrower numerical ranges were all expressly written herein. The diameter of the conically shaped vent at the front side is at least equal or smaller than the diameter/outline of the object(s) to be stopped from moving so that the object(s) to be stopped, e.g. bristle(s) do not enter the opening of the vent, but remain at the front side of the baffle plate. A suitable diameter of the opening at the front side may be in the range of from about 0.01 mm to about 0.15 mm, or in the range from about 0.02 mm to about 0.1 mm, or in the range of from about 0.03 mm to about 0.08 mm, or in the range of from about 0.035 mm to about 0.08 mm or any other numerical range which is narrower and which falls within such broader numerical range, as if such narrower numerical ranges were all expressly written herein.

The conically spaced vents may be distributed all over the baffle plate or over the predefined area intended to comprise the vents equally or irregularly. A distance between the opening of one vent at the back side of the baffle plate to the opening of the neighboring vent may be smaller than the diameter of the opening area of the vents at the front side. A suitable distance of the openings at the back side may be in the range of from about 0.001 mm to about 0.1 mm, or in the range of from about 0.001 mm to about 0.01 mm, or in the range of from about 0.001 mm to about 0.005 mm or any other numerical range which is narrower and which falls within such broader numerical range, as if such narrower numerical ranges were all expressly written herein.

According to another aspect there is provided a transportation device, in particular a bristle transportation device, comprising a baffle plate as disclosed herein. All features described with respect to the baffle plate alone, whether described individually or in combination, are also applicable to the baffle plate used in the transportation device.

The transportation device is suitable for transferring objects, such as bristles from one location to another location. For example, bristles may be transferred from a storage unit to a device for the automated production of brushes, in particular toothbrushes. Individual bristles and/or arrangements of several bristles such as bristle tufts or puks may be transferred in the transportation device disclosed herein. The transportation device comprises at least one tube in which the bristles are transported comprising a first end and a second end, wherein the bristles are transferred preferably from the first end to the second end. More than one tube may be used in parallel. At the first end of each of the tubes a nozzle may be arranged which is suitable to guide the bristles into the tube. The nozzle may have the same diameter than the tube or the nozzle may be a funnel.

The bristles to be transported into the tube may be for example provided by a picking device. Picking devices suitable for separate a predefined number of bristles form a bristles storage in order to form a bristle tuft are widely known from the prior art. "Picking" as understood herein shall include all possible mechanical methods for separating individual bristles from a bristle storage. For example the predefined number of bristles may be grabbed actively by a grab or bristles may be pushed continuously from a storage container in the direction of a passive picker having a recess able to accept a predefined number of bristles. Picker units are known by the skilled person e.g. from WO2011/128020A1. The picked number of bristles, named bristle tuft, are then provided to the first end of the tube and/or the nozzle at the tube of the transportation device. Alternatively, the bristles may be directly sucked from a storage container by the first end of the tube and/or the nozzle at the tube of the transportation device to form a bristle tuft. Two or more initially separated bristle tufts may be combined later on. In addition or alternatively, larger numbers of bristles such as bristle puks may also be provided to the first end of the tube and/or the nozzle at the tube of the transportation device by additional automated providing units.

At a second end of the tube(s) a baffle plate having the conically shaped vents as disclosed herein may be arranged. Several second ends of several tubes may be arranged at one baffle plate. The baffle plate is arranged in such that the objects to be transported inside the tubes are stopped at the baffle plate. In particular, the baffle plate comprises a front side and a back side and the baffle plate is arranged with its front side towards the end of the tube which delivers the object(s) transported therein. In this arrangement the front side of the baffle plate may be adapted to stop the objects to be transported. For example, the front side may be smooth, such as polished, so that the transported object, such as bristles, are not mechanically amended and/or damaged by baffling to the baffle plate. In addition or alternatively, the back side of the baffle plate may comprise attachment and/or mounting units suitable to mount the baffle plate inside the transportation device.

In addition, the transportation device comprises a device which is suitable to produce an airflow inside the at least one tube. Said airflow device may comprise a blowing or a sucking unit, such a vacuum pump. If the airflow producing device comprises a blowing unit, the airflow device may be arranged at the first end of the tube(s) of the transportation device. If the airflow producing device comprises a sucking unit it may be arranged at the second end of the tube(s) of the transportation device. That means that the airflow producing device is arranged in such in the transportation device that an airflow is formed in the at least one tube from the first end to the second end in order to transport thereby. Thus, the objects to be transported, e.g. bristles, are transported from the first end to the second end. That means if a sucking device is used, the bristles can be sucked from a storage container or any other storage unit providing the bristles to the transportation device. Thereby, the bristles may be sucked into the at least one tube and can be transported therein from the first end of the tube comprising the nozzle to the second end of the tube arranged at the baffle plate. After passing the second end of the tube the movement of the bristles is stopped by baffling against the baffle plate. That means the bristles leave the tube at least partially and are moved against the front side of a baffle plate.

At the backside of the baffle plate the airflow producing device may be arranged. For example, a sucking device, in particular a vacuum sucking device may be arranged at the backside of the baffle plate. The sucking device may be mounted directly to the backside of the baffle plate. Alternatively, the sucking device is arranged with a distance to the baffle plate which might be advantageous due to geometric reasons. For example, one or more vacuum tubes may be arranged between the baffle plate and the sucking device. Vacuum tubes are flexible to arrange and easy to mount to the baffle plate. In particular, each area of the baffle plate comprising vents may be connected to one vacuum tube. In this arrangement the vacuum tubes and the areas of the baffle plate comprising the vents may have the same geometric dimensions. Alternatively, several areas of the baffle plate comprising vents may be attached to one or more vacuum nozzles and several vacuum nozzles may be connected to one large vacuum tube. Generally, the geometric requirements of the transportation device have to be met during mounting the baffle plate and the final arrangement of the baffle plate, the sucking device and the connecting vacuum tubes depends on these geometric requirements. Further, intermediate, supporting and/or connecting elements may be arranged as well between the baffle plate and the sucking device. For example, the vacuum tube may be connected directly to the vacuum pump or further vacuum valve(s) and/or vacuum chamber(s) may be arranged between the vacuum pump and the vacuum tube due to geometric and/or process stability and reliability reasons. Finally, a continuous and stable airflow has to be establishable in the transportation device and all individual parts are arranged in such that said airflow is produced.

Surprisingly, it was found that the use of a baffle plate as disclosed herein comprising conically shaped vents improves the device performance of the disclosed transporting device dramatically. In particular, the transport of bristles by airflow in tubes requires that the bristles do not crimp during the transport or stuck into the tubes so that the tubes become blocked. In addition, dust may accumulate in the tube as well as at every other porous baffle plate, such as networks or solid plates having normal venting holes. However, use of a baffle plate comprising conically shaped vents avoids accumulation of any dust at the baffle plate thereby providing a continuously strong airflow which improves the performance and reliability of the transportation device significantly. Thereby, dust accumulation in the tubes is reduced as well, e.g. due to the continuously and equally strong airflow. That means due to use of the disclosed baffle plate lifetime of the transportation device and process reliability of the bristle transport can be improved.

In addition a distribution unit may be arranged between the second end of the tube into which the objects are transported and the baffle plate. Said distribution unit may be arranged in such that it can be removed from its position between the second end of the transportation tube and the baffle plate. Due to its location between the transportation tube and the baffle plate the distribution unit houses the objects transported inside the tube at least partially. For example, if bristles are transported inside the tube, the bristles leave the second end of the tube, pass the distribution unit and stop at the baffle plate. Depending on the thickness of the distribution unit the bristles leave the transportation unit completely and are housed by the distribution unit. That allows the bristles to be removed from the transportation device at their position at the baffle plate by removing the distribution unit. That means the distribution unit shall be arranged removable inside the transportation device.

In addition, the distribution unit may comprise channels into which the bristles are transferred after leaving the transportation tube. Suitable channels may have the same diameter than the tube or the diameter of the channels in the distribution unit may be slightly larger. The distribution unit may comprise more than one channel, so that bristles from more than one tube can be transferred to the distribution unit in parallel. In addition, the distribution unit may comprise more channels than the transportation device comprises tubes. In this embodiment, the distribution unit is rearranged in the transportation device in such that after a first transport, wherein the bristles are delivered to a first set of channels, a second transport occurs which delivers the bristles to a second set of channels in the distribution unit. In addition or alternatively, the diameter of the channels may be two or three times of the diameter of the tube so that bristles can be delivered two or three times into one channel of the distribution unit. Using channels having a larger diameter supersized bristle tufts can be formed in the distribution unit. Suitable distribution units are for example wheels or slides which can be removed easily from and into the transportation device.

Using the distribution unit the bristles may be transferred and/or delivered to e.g. an arranging unit into which the bristles may be arranged in a predefined pattern and which may be also part of the devices disclosed herein. The arranging unit may be any unit or device able to arrange the bristle tufts being delivered by the channels of the distribution unit in a predefined pattern. Suitable arranging units are for example splitter, funnels, tubes and sliding elements or combinations thereof, wherein the bristle tufts are transferred from one element to another element thereby amending shape and size. Thereby, the final size, shape and length of the bristle tuft is formed and may be amended compared to the bristle tuft being delivered from the tubes of the transportation device into the distribution unit. In addition, after forming the final size and shape of the tufts, the arranging unit might be also able to arrange several finalized bristle tufts in a predefined tuft pattern.

Said predefined pattern corresponds to a bristle field of a brush intended to be formed and may be transferred to a providing unit. The providing unit is able to provide the predefined bristle tuft pattern to a brush forming unit which forms the final brush. For example, the brush forming unit may be an injection molding machine. Therein the ends of the bristles tufts which protrude from the providing unit can be over-molded thereby forming a brush head or a part thereof. Said brush head may be mounted to a brush handle or the brush handle may be formed in a second injection molding step by over-molding the brush head or the part thereof. Suitable providing units may be for example parts of a mold for the injection molding machine. For example, a part of a mold used as providing unit may be a mold part comprising holes adapted to receive a bristle tuft. In particular, a plurality of holes may be arranged in the mold part in a pre-defined pattern corresponding to the bristle tuft pattern of the brush head to be formed. Said mold parts, called mold bars herein, may comprise more than one hole-pattern so that more than one brush can be formed in parallel. The bristle pattern may be delivered to, e.g. a molding device in order to form a brush comprising the provided bristle pattern by injection molding.

In addition or alternatively to the units and/or devices which may be used after the transportation device, such as the providing unit, additional units and/or devices may be used before the transportation device. For example, the bristle to be transferred using the transportation device as disclosed herein might be pre-treated for example by end rounding in an end-rounding unit. End-rounding means a cascade of grinding and polishing steps so that the end of a bristle which is sharp after cutting from a longer bristle strand comprises a round, dome-shaped and smooth surface. End-rounded ends are intended to be the cleaning ends of a bristle, namely the ends coming into contact with the oral cavity and the tissues located therein. End-rounding may be for example performed before the bristles are cut into the length. For example, bristle filaments may be end-rounded as hanks. It might be advantageous to end-round the bristle ends of the hank and then cut off a puk of a predefined length. If the bristle ends of the hank were end-rounded before the puk was cut, the bristles located in the puk comprise one end which is end-rounded and one sharp end. In addition or alternatively, the puk might be cut off the hank first and might be end-rounded after cutting. The transportation device comprising the baffle plate as disclosed herein is able to transfer individual bristles, bristles tufts and also a complete bristle puk.

According to another aspect there is provided a method for producing a baffle plate as disclosed herein. The method comprises at least the steps of providing a metal plate or a ceramic plate and forming two or more conically shaped vents in the metal plate using a solid state laser. Suitable solid state lasers are for example a diode-pumped solid state laser, in particular a solid state laser using the Q-switch mode having a high laser beam quality. Suitable diode-pumped solid state laser may be for example ruby or neodymium-doped YAG crystal laser pumped with a laser diode. In particular, a "Powergator 1064" available by Lambda Physik or "Innoslab 1064-40E" available by Edgewave may be used. The laser may comprise a high speed rotation axis of $U_{max}$=13500 1/sec.

In addition, using a small pulse force combined with a long drilling time high quality vents can be achieved. The drilling time may be for example in the range from about 30 sec to about 120 sec, or in the range from about 40 sec to about 100 sec, or in the range of from about 45 sec to about 90 sec or any other numerical range which is narrower and which falls within such broader numerical range, as if such narrower numerical ranges were all expressly written herein. The pulse force may be for example in the range from about 0.1 mJ to about 5 mJ, or in the range from about 0.2 mJ to about 4.5 mJ, or in the range of from about 0.4 mJ to about 4 mJ or any other numerical range which is narrower and which falls within such narrower numerical range, as if such narrower numerical ranges were all expressly written herein. The combination of drilling time and pulse force depends on the material used for the baffle plate as well as the thickness of the baffle plate. A suitable laser pulse frequency is in the range from about 1 kHz to about 30 kHz, or in the range from about 3 kHz to about 25 kHz, or in the range of from about 5 kHz to about 20 kHz or any other numerical range which is narrower and which falls within such broader numerical range, as if such narrower numerical ranges were all expressly written herein.

In addition the solid state laser is inclined relative to the back side of the baffle plate to be formed and rotated with an inclination angle α. The inclination angle α may be in the range from 1.5 degree to 3.5 degree, or in the range from 2 degree to 3 degree r any other numerical range which is narrower and which falls within such broader numerical range, as if such narrower numerical ranges were all expressly written herein. Depending on the distance of the laser from the focal point the inclination angle a may be further amended. Alternatively, the conically shaped vents may be produced by focusing the laser behind the bottom of the vent to be formed or by varying the pulse frequency of the solids state laser.

In the following, a detailed description of several example embodiments will be given. It is noted that all features described in the present disclosure, whether they are disclosed in the previous description of more general embodiments or in the following description of example embodiments of the devices, even though they may be described in the context of a particular embodiment, are of course meant to be disclosed as individual features that can be combined with all other disclosed features as long as this would not contradict the gist and scope of the present disclosure. In particular, all features disclosed for either one of the baffle plate or the transportation device using the baffle plate may also be combined with and/or applied to the other one, if applicable.

FIG. 1 shows a schematic top view of the baffle plate 10. The baffle plate 10 as disclosed herein is suitable to stop the movement of an object, such as individual bristles and/or arrangements of several bristles, such as bristle tufts. All numbers and arrangement of bristles will be referenced with the reference number 30. Bristles 30 may be for example monofilaments made from plastic material such as polyamide (PA), in particular PA 6.10 or PA 6.12. The diameter of the bristle may be in the range from about 0.1 to about 0.16 mm or and the bristles may be cut into pieces of a length in the range of about 0.8 to about 1.5 mm. Several bristles may be arranged into groups, such as bristle tufts or larger groups, such as puks.

The body of the baffle plate 10 is made from a metal or metal alloy such as stainless steel. In a predefined area A the baffle plate 10 comprises a plurality of conically shaped vents 20. The area A shown herein is a circular are, but any other geometric form may be suitable as well. The vents 20 may be distributed regularly over the area A. Due to the vents 20 the baffle plate 10 is pervious to air and can be used in airflow driven transportation devices.

Figure 1B:
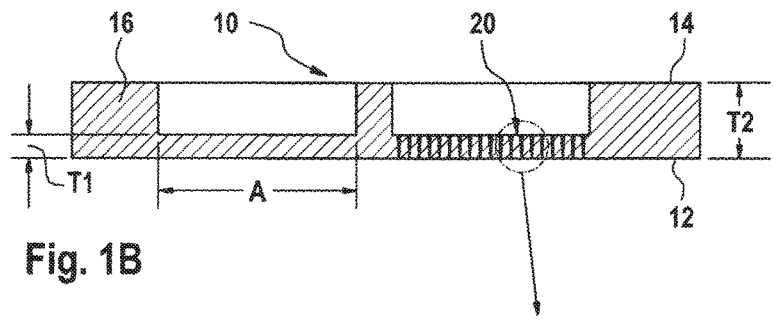
FIG. 1B shows a schematic sketch of a side view of the baffle plate 10 having conically shaped vents 20.

FIG. 1B shows a schematic side view of the baffle plate 10 shown in FIG. 1A. All features disclosed in FIG. 1A, whether described individually or in combination are also applicable to the baffle plate 10 shown in FIG. 1B and vice versa. The baffle plate 10 comprises a front side 12 and a back side 14. The conically shaped vents 20 are arranged in two defined areas A in the middle of the baffle patent 10. The outline of the baffle plate 10 is not limited, but should meet the geometric requirement of the environment where the baffle plate 10 is used. At the backside 14 the baffle plate 10 comprises a circumferential border 16 which is present in all areas which do not comprise the vents 20. That means the baffle plate comprises a first thickness T1 in the area A of the vents 20 and a second thickness T2 in the remaining area of the baffle plate comprising the thickness T1 plus the thickness of the border. Thus, the second thickness T2 is larger than the first thickness T1. Suitable values for the thickness T1 are in the range of from 0.5 mm to 3 mm. Suitable values for the thickness T2 are in the range of from 1 mm to several mm.

Figure 1C:
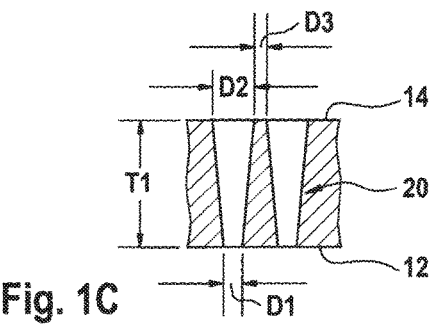
FIG. 1C shows a magnification of the conically shaped vents 20 of the baffle plate 10.

FIG. 1C shows a magnification of the conically shaped vents 20 of baffle plate 10 shown in FIG. 1B. All features disclosed in FIGS. 1A and 1B, whether described individually or in combination are also applicable to the magnification of the baffle plate 10 shown in FIG. 1C and vice versa. Two conically shaped vents 20 are shown as an example in the magnification. The opening area of the vents 20 is different between the front side 12 and the back side 14 of the baffle plate 10 so that a conically increasing channel is formed. The diameter D2 at the back side 14 of the baffle plate 10 is larger than the diameter D1 at the front side 12 of the baffle plate 10. For example the diameter D1 may be in the range of from 0.035 mm to 0.08 mm and the diameter D2 may be in the range of from 0.085 mm to 0.15 mm. The length of the conically shaped vent 20 is identical to the thickness T1 of the baffle plate 10. Several conically shaped vents 20 are arranged in a predefined area A. The distribution of the vents 20 over the area A may be regularly. A distance D3 between the openings of one vent 20 at the back side 14 of the baffle plate 10 and the neighboring vent 20 may be in the range from 0.001 mm to 0.002 mm.

Figure 2:
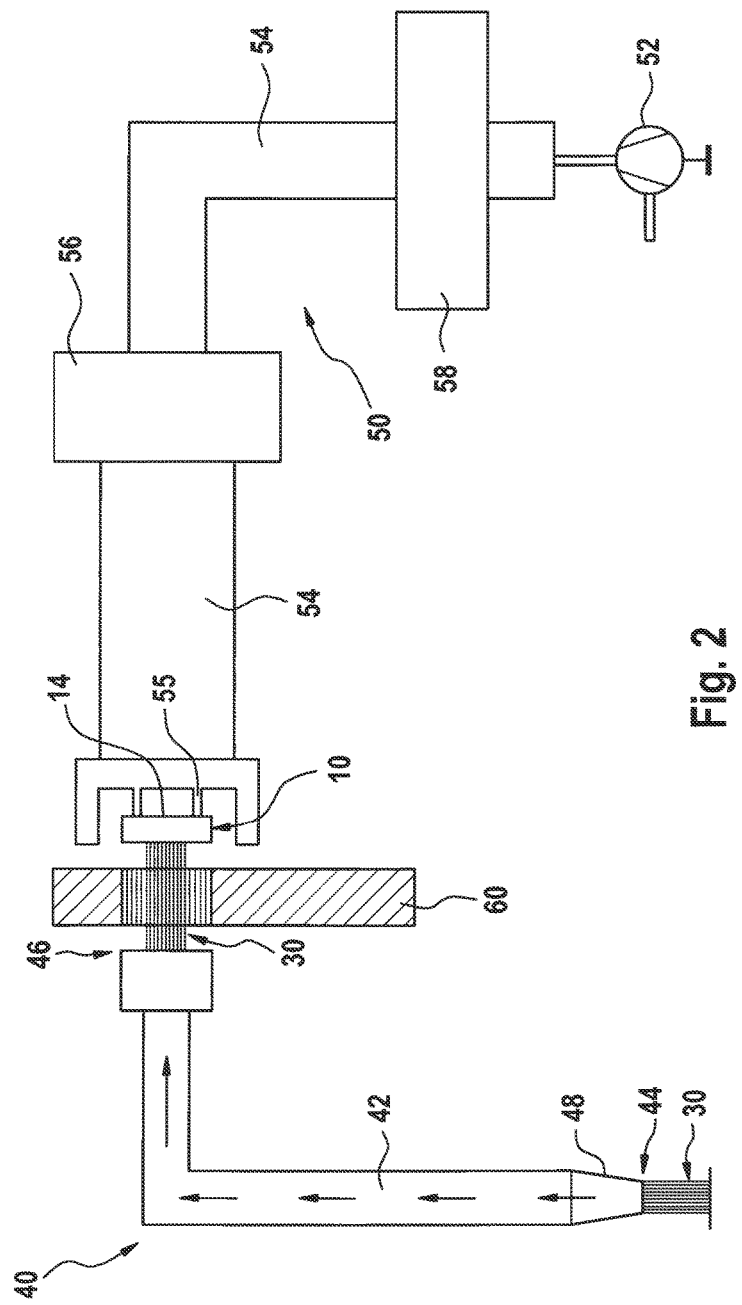
FIG. 2 shows a schematic sketch of a transportation device 40 using a baffle plate 10 having conically shaped vents 20.

FIG. 2 shows schematically a bristle transportation device 40 comprising a baffle plate 10 as shown in FIGS. 1A to 1C. All features disclosed in FIG. 1, whether described individually or in combination are also applicable to the baffle plate 10 shown in FIG. 2. Features that are in common with the baffle plate 10 shown in FIG. 1 are designated with the same reference numerals and are not described in detail again.

The transportation device 40 is suitable for transferring objects, such as bristles 30, from one location to another location. For example, bristles 30 may be transferred from a storage unit to a device for the automated production of brushes, in particular toothbrushes. The transportation device 40 comprises at least one tube 42 comprising a first end 44 and a second end 46 in which the bristles 30 are transported. More than one tube 42 may be used in parallel. At a first end 44 of the at least one tube 42 a nozzle 48 may be arranged which is suitable to guide the bristles 30 into the tube 42. At a second end 46 of the tube 42 an airflow device 50 is arranged suitable to produce an airflow inside the at least one tube 42. Said airflow device 50 may comprise a sucking unit 52, such a vacuum pump. That means, the bristles 30 can be sucked from a storage container or any other unit providing the bristles 30 into the tube 42 and can be transported therein from the first end 44 of the tube 42 comprising the nozzle 48 to the second end 46 of the tube 42. After passing the second end 46 of the tube 42 the movement of the bristles 30 is stopped by a baffle plate 10. That means the bristles 30 leave the tube 42 and are moved against a front side 12 of a baffle plate 10.

At the backside 14 of the baffle plate 10 one or more vacuum tubes 54 are arranged. In particular, each area A of the baffle plate 10 comprising vents 20 may be connected to a vacuum tube 54 directly. Alternatively, vacuum nozzles 55 are connected to the backside 14 of the baffle plate 10. Several vacuum nozzles 55 can be connected to one large vacuum tube 54. The vacuum tube 54 may be connected directly to the vacuum pump 52. Alternatively, further vacuum valve(s) 56 and/or vacuum chamber(s) 58 may be arranged between the vacuum pump 52 and the vacuum tube 54 due to geometric and/or process stability and reliability reasons.

Between the second end 46 and the baffle plate 10 a distribution unit 60 may be arranged. Said distribution unit 60 may be arranged in such that it can be removed from its position between the second end 46 of the tube 42 and the baffle plate 10. Due to its location between the tube 42 and the baffle plate 10 the distribution unit 60 comprises the bristles 30 after the bristles have left the second end 46 of the tube 42. That means by removing the distribution unit 60 from its position in the transportation device 40 the bristles 30 are removed as well. The distribution unit 60 may comprise channels into which the bristles 30 are transferred after leaving the tube 42. Suitable distribution units 60 are for example wheels or slides which can be removed easily from and into the transportation device 40. Using the distribution unit 60 the bristles 30 may be transferred and/or delivered to e.g. an arranging unit into which the bristles 30 are arranged in a predefined form and pattern. After forming the final size and shape of the bristles 30 transferred via the transportation device 40 as disclosed the bristles 30 are arranged in a predefined pattern corresponding to a bristle field of a brush intended to be formed. Said bristle pattern may be delivered to, e.g. a molding device in order to form a brush comprising the provided bristle pattern using injection molding.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A baffle plate for use in a transportation device for transferring bristles and/or bristle tufts (30) in the automated production of brushes, the baffle plate suitable to stop a movement of the bristles and/or bristle tufts (30), the baffle plate comprising a front side (12), a back side (14), and a predefined area on the back side comprising at least two or more conically shaped vents (20), wherein the diameter (D) of the conically shaped vents (20) increases from the front side (12) to the back side (14) and wherein a front diameter (D1) of the two or more vents (20) is at least smaller than a cross-sectional diameter of the bristles and/or bristle tufts (30).

2. The baffle plate (10) according to claim 1, wherein a back diameter (D2) of the two or more vents (20) at the back side (14) is in the range from 1.2 to 4 times of the front diameter (D1) at the front side (12).

3. The baffle plate (10) according to claim 1, wherein the front diameter (D1) is in the range from 0.01 mm to 0.15 mm.

4. The baffle plate (10) according to claim 1, wherein the two or more vents (20) are spaced from one another at the back side (14) of the baffle plate (10) with a distance (D3) smaller than the front diameter (D1) of the two or more vents (20).

5. The baffle plate (10) according to claim 1, wherein the baffle plate (10) comprises a circumferential border (16) at the back side (14).

6. The baffle plate (10) according to claim 5, wherein the circumferential border (16) comprises a mounting area structured and configured to attach a device (50) for producing airflow.

7. A method for producing a baffle plate (10) according to claim 1, the method comprising providing a metal plate; and forming the two or more conically shaped vents (20) using a solid state laser.

8. The method according to claim 7, wherein the solid state laser is inclined relative to the back side (14) of the metal plate and rotated with an inclination angle (α).

9. The method according to claim 8, wherein the inclination angle (α) is from 1.5 degree to 3.5 degree.

10. A transportation device (40) for transferring bristles and/or bristle tufts (30) for an automated production of brushes, the transportation device comprising:

at least one tube (42) comprising a first end (44) and a second end (46) in which the bristles and/or bristles tufts (30) are transported, wherein the bristles and/or bristle tufts (30) being transferred have a cross-sectional diameter;

a nozzle (48) arranged at the first end (44) of the at least one tube (42) structured and configured to guide the bristles and/or bristle tufts (30) into the tube (42);

a device (50) for producing an airflow inside the at least one tube (42); and a baffle plate (10) comprising a front side (12), a back side (14), and a predefined area on the back side comprising two or more conically shaped vents (20), wherein the diameter (D) of the conically shaped vents (20) increases from the front side (12) to the back side (14), and wherein a front diameter (D1) of the conically shaped vents (20) is at least smaller than the cross-sectional diameter of the bristles and/or bristle tufts (30) being transferred, wherein the baffle plate (10) is arranged at the second end (46) of the at least one tube (42), and the device (50) is arranged such that the bristles and/or bristle tufts (30) are transferred from the first end (44) of the tube (42) to the second end (46) of the tube (42).

11. The transportation device (40) according to claim 10, wherein the device (50) for producing an airflow is arranged at the backside (14) of the baffle plate (10).

12. The transportation device (40) according to claim 11, wherein the device for producing an airflow (50) is a sucking device.

13. The transportation device (40) according to claim 10, wherein a distribution unit (60) is arranged between the second end (46) of the tube (42) and the baffle plate (10).

14. The transportation device (40) according to claim 13, wherein the distribution unit (60) comprises at least one channel arranged as an elongation of the at least one tube (42) of the transportation device (40).

* * * * *